US007685195B2

(12) United States Patent
Pope

(10) Patent No.: US 7,685,195 B2
(45) Date of Patent: Mar. 23, 2010

(54) SYSTEMS AND METHODS FOR ANALYZING WEB SITE SEARCH TERMS

(75) Inventor: David C. Pope, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 321 days.

(21) Appl. No.: 11/088,523

(22) Filed: Mar. 24, 2005

(65) Prior Publication Data

US 2006/0218106 A1    Sep. 28, 2006

(51) Int. Cl.
    *G06F 17/30* (2006.01)
(52) U.S. Cl. .................... 707/722; 707/768; 705/37; 705/14
(58) Field of Classification Search .................... None
    See application file for complete search history.

(56) References Cited

U.S. PATENT DOCUMENTS

| 6,006,225 | A * | 12/1999 | Bowman et al. ................ 707/5 |
| 6,338,066 | B1 | 1/2002 | Martin et al. |
| 6,393,479 | B1 | 5/2002 | Glommen et al. |
| 6,584,465 | B1 * | 6/2003 | Zhu et al. ....................... 707/6 |
| 6,615,247 | B1 | 9/2003 | Murphy |
| 6,631,372 | B1 * | 10/2003 | Graham ........................ 707/5 |
| 6,766,370 | B2 | 7/2004 | Glommen et al. |
| 6,836,773 | B2 * | 12/2004 | Tamayo et al. ................ 707/6 |
| 7,260,568 | B2 * | 8/2007 | Zhang et al. ................... 707/3 |
| 7,278,105 | B1 * | 10/2007 | Kitts ........................... 715/736 |
| 7,302,426 | B2 * | 11/2007 | Bier .............................. 707/3 |
| 7,330,850 | B1 * | 2/2008 | Seibel et al. ................... 707/4 |
| 7,363,300 | B2 * | 4/2008 | Davis et al. .................... 707/3 |
| 7,395,259 | B2 * | 7/2008 | Bailey et al. ................... 707/3 |
| 7,424,486 | B2 * | 9/2008 | Whitman et al. ............ 707/102 |
| 7,461,056 | B2 * | 12/2008 | Cao et al. ...................... 707/4 |
| 7,464,089 | B2 * | 12/2008 | Oh et al. ........................ 707/6 |
| 2002/0062341 | A1 * | 5/2002 | Sueki et al. ................. 709/203 |
| 2002/0161673 | A1 * | 10/2002 | Lee et al. ...................... 705/27 |
| 2003/0014399 | A1 * | 1/2003 | Hansen et al. ................. 707/3 |
| 2003/0154442 | A1 | 8/2003 | Papierniak |
| 2003/0195812 | A1 | 10/2003 | Nguyen |
| 2003/0229537 | A1 * | 12/2003 | Dunning et al. .............. 705/10 |
| 2004/0059746 | A1 * | 3/2004 | Error et al. ................. 707/102 |
| 2004/0088241 | A1 * | 5/2004 | Rebane et al. ................ 705/37 |
| 2004/0158560 | A1 * | 8/2004 | Wen et al. ..................... 707/4 |
| 2004/0220905 | A1 * | 11/2004 | Chen et al. .................... 707/3 |

OTHER PUBLICATIONS ktmatu:Relax, http://ktmatu.com/software/relax (released 2003) (visited Apr. 23, 2009) (compilation of 54 pages attached).*

(Continued)

*Primary Examiner*—Neveen Abel Jalil
*Assistant Examiner*—Christyann R Pulliam
(74) *Attorney, Agent, or Firm*—Jones Day

(57) ABSTRACT

Systems and methods are provided for identifying candidates for new search terms that may be purchased from a search engine company. Candidate search terms are identified from a session log, such as by analyzing the presence of the candidate search terms in relation to data stored in the session log.

33 Claims, 10 Drawing Sheets

OTHER PUBLICATIONS

"HitBox Professional Service Highlights", http://www.hitboxprofessional.com/learn/features.html, (11 pp.).

Aberdeen Group, Inc., "Web Analytics: Translating Clicks into Business", Dec. 2000, pp. 1-149.

Undated publication entitled "Web Services with SAS® Enabling New Opportunities for Your Business" (6 pp.).

Undated publication entitled "SAS® Web Report Studio—An Introduction and Overview" (27 pp.).

* cited by examiner

| | Referring Page | Possible Term From Page | Session Count |
|---|---|---|---|
| 1 | www.google.com/ | Information Technology | 11 |
| 2 | www.google.com/ | ROI | 9 |
| 3 | www.google.com/ | analytics | 4 |
| 4 | www.google.com/ | computers | 3 |
| 5 | www.google.com/ | software | 2 |
| 6 | www.yahoo.com/ | business software | 1 |
| 7 | www.yahoo.com/ | computers | 1 |
| 8 | www.yahoo.com/ | technology | 1 |

Fig. 4

| | Existing Search Term | Possible Term From Term | Session Count |
|---|---|---|---|
| 1 | business management | MBA | 9 |
| 2 | business management | ROI | 1 |
| 3 | business management | balanced scorecard | 1 |
| 4 | federal government | Congress | 1 |
| 5 | federal government | Executive Branch | 1 |
| 6 | federal government | Judicial Branch | 1 |
| 7 | federal government | Legislative Branch | 1 |
| 8 | federal government | US Senate | 1 |

| Session Count | % of Total Sessions | Confidence | Page 1 | Page 2 | Page 3 | P |
|---|---|---|---|---|---|---|
| 43 | 1.11 | 100.00 | federal government | Advanced Search Results | | |
| 31 | 0.80 | 72.09 | federal government | Advanced Search Results | Site Exit | |
| 10 | 0.26 | 23.26 | federal government | Advanced Search Results | Advanced Search Results | |
| 1 | 0.03 | 2.33 | federal government | Advanced Search Results | Business Management- Business Articles- Online Education for Managers | |
| 1 | 0.03 | 2.33 | federal government | Advanced Search Results | Store Product Principles of Federal Income Taxation Law | |
| 6 | 0.15 | 60.00 | federal government | Advanced Search Results | Advanced Search Results | Ad Se Re |
| 3 | 0.08 | 30.00 | federal government | Advanced Search Results | Advanced Search Results | Si |
| 1 | 0.03 | 10.00 | federal government | Advanced Search Results | Advanced Search Results | Ad Se |
| 1 | 0.03 | 100.00 | federal government | Advanced Search Results | Business Management- Business Articles- | Ad Se Re |

Σ X̂ M̂ mode Ŝ S   Summarize: ● Overall ○ By variables:   Page 1

*Fig. 9*

SYSTEMS AND METHODS FOR ANALYZING WEB SITE SEARCH TERMS

FIELD

The technology described in this patent document relates generally to computer-implemented data processing, and more specifically to processing of user internet-related activity data.

BACKGROUND AND SUMMARY

Many web site operators purchase search terms from search engine companies in an attempt to drive users to their web site. Web log analysis tools are available that provide a list of search terms to bring users to the web site along with counts such as number of sessions attributed per search term.

In accordance with the teachings described herein, systems and methods are provided for identifying candidates for new search terms that may be purchased from a search engine company. As an example, a method can be used with one or more processing devices in order to identify candidate search terms and may include the steps of: receiving a session log that stores data associated with pages in a web site that were accessed during a web browser session; and processing the session log to identify one or more candidate search terms based upon analyzing the presence of the candidate search terms within the data stored in the session log. The one or more candidate search terms may be provided for use as input to a search engine program to locate information associated with the web site.

As another example, a system can be configured to identify candidate search terms and may include a web server and software instructions. The web server may be configured to communicate with a web browser over a computer network, and to create a session log that stores data associated with pages in a web site that were accessed during a web browser session. The software instructions may be configured to process the session log to identify one or more candidate search terms based upon analyzing the presence of the candidate search terms within the data stored in the session log.

BRIEF DESCRIPTION OF THE DRAWINGS

FIG. 4 is an example of a new search term report that lists candidate search terms identified in connection with one or more referring pages.

FIG. 5 is an example of a new search term report that lists candidate search terms that have been identified as having a statistically significant correlation with an existing search term.

FIG. 9 depicts an example of a more detailed search term validation report for a particular search term.

DETAILED DESCRIPTION

Figure 1:
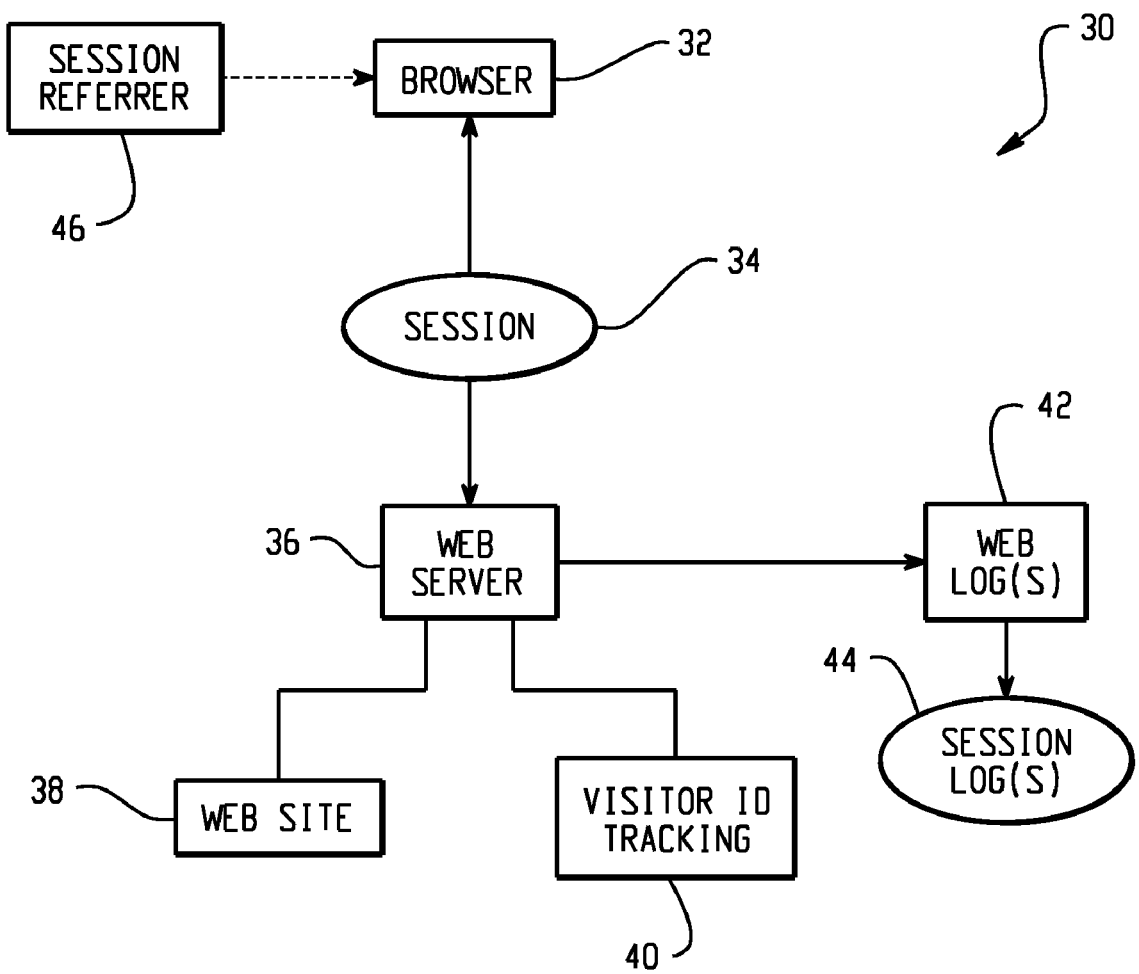
FIG. 1 is a block diagram depicting an example computer-implemented system for recording user internet-related activity data.

FIG. 1 is a block diagram depicting an example computer-implemented system 30 for recording user internet-related activity data. The system 30 includes a web browser 32 that communicates with a web server 36 over a computer network, such as the Internet. Typically during a web browser session 34, the web browser 32 provides requests to the web server 36 to access content of a web site 38. A web browser 32 may be considered to be in a session 34 with a web server 36 when it is executing a set of requests, to the web server 36. During a normal session 34 requests are logically related. For example, the browser 32 of a person searching for a book may make hundreds of requests to the web server 36, and the person may conclude the session 34 with the purchase of a book. These requests and the ultimate transaction of the session are recorded in a web log 42. The individual session records stored in the web log 42 are session logs 44.

A web log 42 is an electronic record of browser activities of a particular website 38. A browser 32 of a website 38 is assigned an electronic visitor identifier 40 that permits the web server 36 to record the pages and links followed by a browser 32. Website owners and advertisers are interested in using visitor identification information 40 to ascertain where on the Internet web browser 32 was prior to the first request of a session 34 kept in the web log 42. This information is stored in the web log 42 as the referrer. The referrer of the first request of a session is called the session referrer 46. This piece of information is used in designing websites, paying advertisers, paying referring sites and in many other ways. An example system and method for processing web activity data in order to associate a session referrer 46 with a web log 42 is described in commonly-owned U.S. patent application Ser. No. 10/271,340, entitled "System and Method for Processing Web Activity Data," which is incorporated herein by reference.

Figure 2:
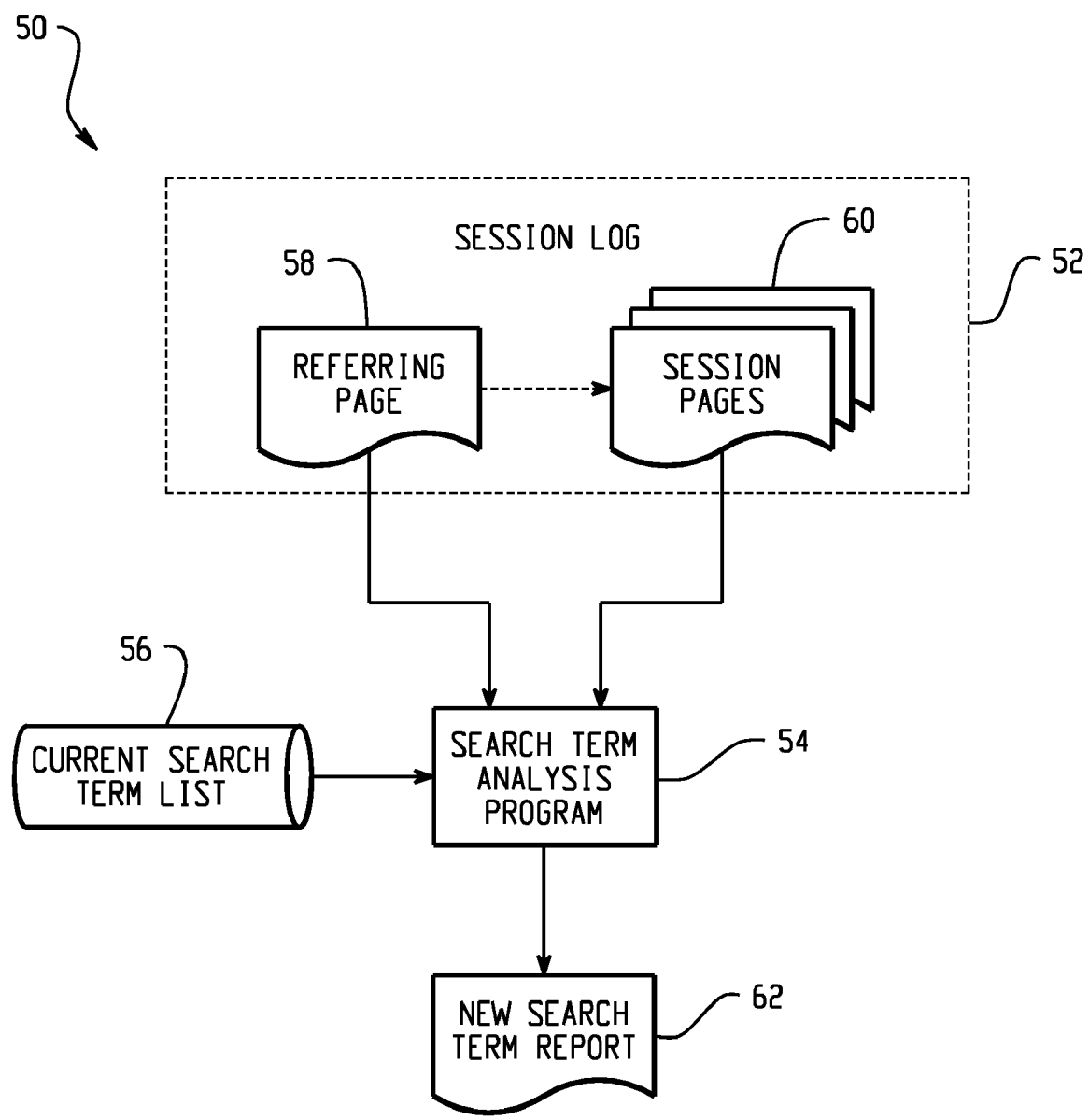
FIG. 2 is a block diagram depicting an example computer-implemented system for identifying web site search terms from user internet-related activity data.

FIG. 2 is a block diagram depicting an example computer-implemented system 50 for identifying web site search terms from user internet-related activity data. The system 50 includes a search term analysis program 54 that processes a session log 52 and a database of current search terms 56 to generate a report 62 identifying one or more candidate search terms. The database of current search terms 56 may include one or more lists of search terms that the web site operator has purchased from search engine companies. The new search term report 62 generated by the search term analysis program 54 identifies one or more additional search terms that the web site operator may consider for purchasing based on an analysis of the data in the session log(s) 52.

The session log 52 includes data from the web pages (session pages) 60 accessed by the browser during the web browser session, and may also include data from the referring page 58. The search term analysis program 54 may, for example, be a data mining program that uses data mining techniques to identify terms from the data 58, 60 stored in the session log 52. The terms identified from the session log 52 may then be compared with the database of current search terms 56 to identify one or more new candidate search terms that are provided to the web site operator in the new search term report 62. For example, the search term analysis program 54 may use clustering techniques, prediction algorithms, and/or other data mining methods to identify terms that are likely to be input to a search engine program to identify the website. Criteria used by the search term analysis 54 for identifying candidate search terms may include the frequency that the term appears in the referring page 58 or the session page(s) 60, the proximity of the term to other terms in the referring or session pages 58, 60 (e.g., the proximity to current search terms 56 or to a search term used to access the web site), the page on which the term appears (e.g., certain pages 58, 60 may be weighted higher than others), and/or other criteria for identifying relevant terms from a textual database.

Figure 3:
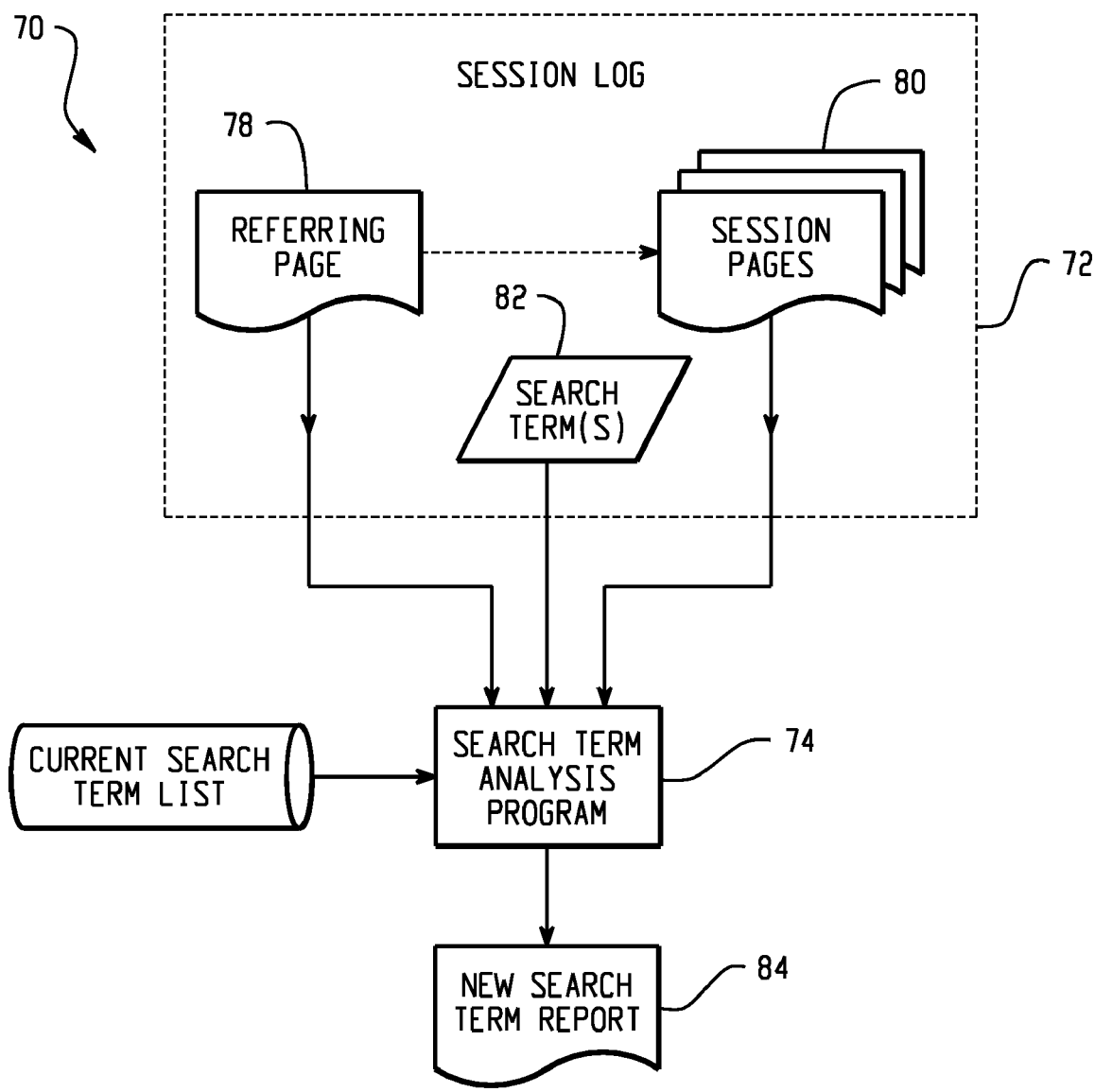
FIG. 3 is a block diagram depicting another example computer-implemented system for identifying web site search terms from user internet-related activity data.

FIG. 3 is a block diagram depicting another example computer-implemented system 70 for identifying web site search terms from user internet-related activity data. With reference to FIG. 3, the referring search term(s) 82 used to access the web site from the referring page 78 are included in the session log 72 and are used by the data miner 74 in generating the new search term report 84. The session log 72 may, for example, be generated by attaching the search term(s) 82 that drove the user to the web site as the first page of the session log 72, and applying pathing analysis techniques to track which pages 80 are viewed during the web browser session associated with the search term(s) 82. The text from the referring page 78 may also be included in the session log 72.

In operation, the search term analysis program 74 identifies statistically significant correlations between the search term (s) 82 and other terms in the session pages 80 to identify candidate search terms 84. For example, the search term analysis program 74 may be a data mining program that identifies candidate search terms using data mining techniques, such as word correlation (e.g., based on the number of times a word in the session page 80 appears within a predetermined proximity of a search term 82), or more complex data mining techniques, such as building a data warehouse of terms associated with the session pages 80 and applying various models to uncover statistical relationships between the search term(s) 82 and the terms. In addition, if text from the referring page 78 is included in the session log 72, then the search term analysis program 74 may also use the same or similar data mining techniques to identify candidate search terms from the referring page 78. Some example data mining techniques that may be used with the systems and method described in the present application are described in commonly owned U.S. patent application Ser. No. 10/159,792, entitled "Computer-Implemented System and Method for Text-Based Document Processing," which is incorporated herein by reference.

FIG. 4 is an example of a new search term report 90 that lists candidate search terms 94 identified in connection with one or more referring pages 92. The search term report 90 includes a referring page column 92, a candidate term column 94, and a session count column 96. The referring page column 92 identifies the referring page (e.g., www.google.com/, www.yahoo.com/, etc.) from which the web site was accessed. The candidate search term column 94 lists search terms that were identified in connection with the listed referring pages 92. For example, the list of candidate search terms 94 may include terms have been identified from the text of the referring page. In another example, the list of candidate search terms 94 may include terms that have been identified from the text of one or more session pages that were accessed during a web browser session that was initiated from the referring page 92. The session count column 96 identifies the number of web browser sessions in which the listed candidate search term(s) was identified.

FIG. 5 is an example of a new search term report 100 that lists candidate search terms 104 that have been identified as having a statistically significant correlation with an existing search term 102. The search term report 100 includes an existing search term column 102, a candidate search term column 104 and a session count column 106. The existing search term column 102 may include referring search terms that were used to access the website from the referring page (e.g., the referring search term(s) 82 shown in FIG. 3). The candidate search term column 104 lists search terms that were identified as having a statistically significant correlation with the listed existing search terms 102. The session count column 106 identifies the number of web browser sessions in which the listed candidate search term(s) were identified.

In another example, the existing search term column 102 in FIG. 5 may include one or more current search terms that have already been purchased by the website operator (e.g., the current search term list 56, 76 in FIG. 2 or 3). In this example, the candidate search term(s) 104 may be identified based on a statistically significant correlation between the current search term and one or more terms in the session pages or referring page.

Figure 6:
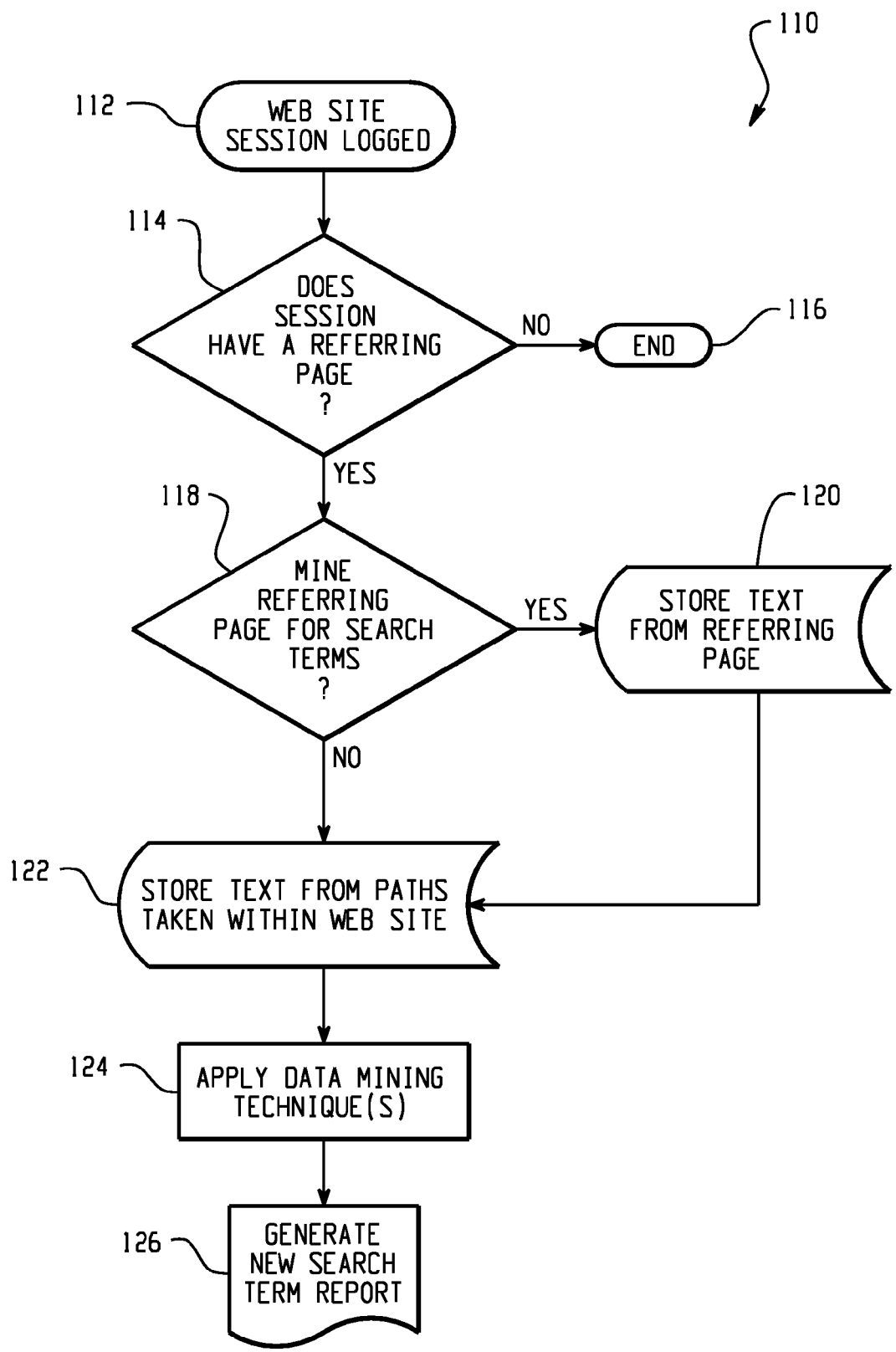
FIG. 6 is a flow diagram depicting a method for identifying web site search terms from user internet-related activity data.

FIG. 6 is a flow diagram 110 depicting a method for identifying web site search terms from user internet-related activity data. A session log is created at step 112 when the web site is accessed by a web browser. If search term(s) were used to access the web site (e.g., search term(s) are included in the web site click-stream data), then the referring search term(s) may be included in the session log, for example as the first page of the session log. Once the session log has been created, the method determines at step 114 whether the session has a referring page. If there is no referring page, or the referring page cannot be determined, then the method ends at step 116. If a referring page is identified at step 114, then the method proceeds to step 118.

At step 118, the method determines whether the referring page is to be processed to identify candidate search terms. The decision at step 118 may be based on user input. For example, a user may be able to pre-select whether all or no referring pages are processed, or the user may be able to input instructions for each session on a case-by-case basis. In another example, a user may be able to input criteria used by the method to determine which session pages should be processed and which should not. For instance, a user may be able to select one or more specific web sites that are to be mined for search terms if they are the referring page of the session, or the user may be able to input some other criteria for the method to determine which referring pages to process (e.g., only mine search engines sites, never mine search engine sites, etc.) In any case, if the method determines that the referring page is to be processed for candidate search terms, then data (e.g., textual data) from the referring page is stored in the session log at step 120 and the method proceeds to step 122. Otherwise, if the referring page is not to be processed for candidate search terms, then the method proceeds from step 118 to step 122.

At step 122, data from the session pages is stored in the session log. The stored data may include textual data from the session pages, search terms used during the session, textual data from attachments to the session pages (e.g., articles, data sheets, etc.), or other data that may be of interest in identifying candidate search terms. Data mining techniques are then applied to the data stored in the session log at step 124 to identify one or more candidate search terms. The data mining techniques may, for example, include word correlation techniques (e.g., based on the number of times a word appears within a predetermined proximity of a search term), or may include other data mining techniques, such as building a data warehouse of terms from the stored data and applying various models to uncover statistical relationships between the terms and existing search terms. The candidate search terms identified in step 124 are then displayed in a new search term report at step 126.

It should be understood that similar to the other processing flows described herein, one or more of the steps and the order in the flowchart may be altered, deleted, modified and/or augmented and still achieve the desired outcome.

Figure 7:
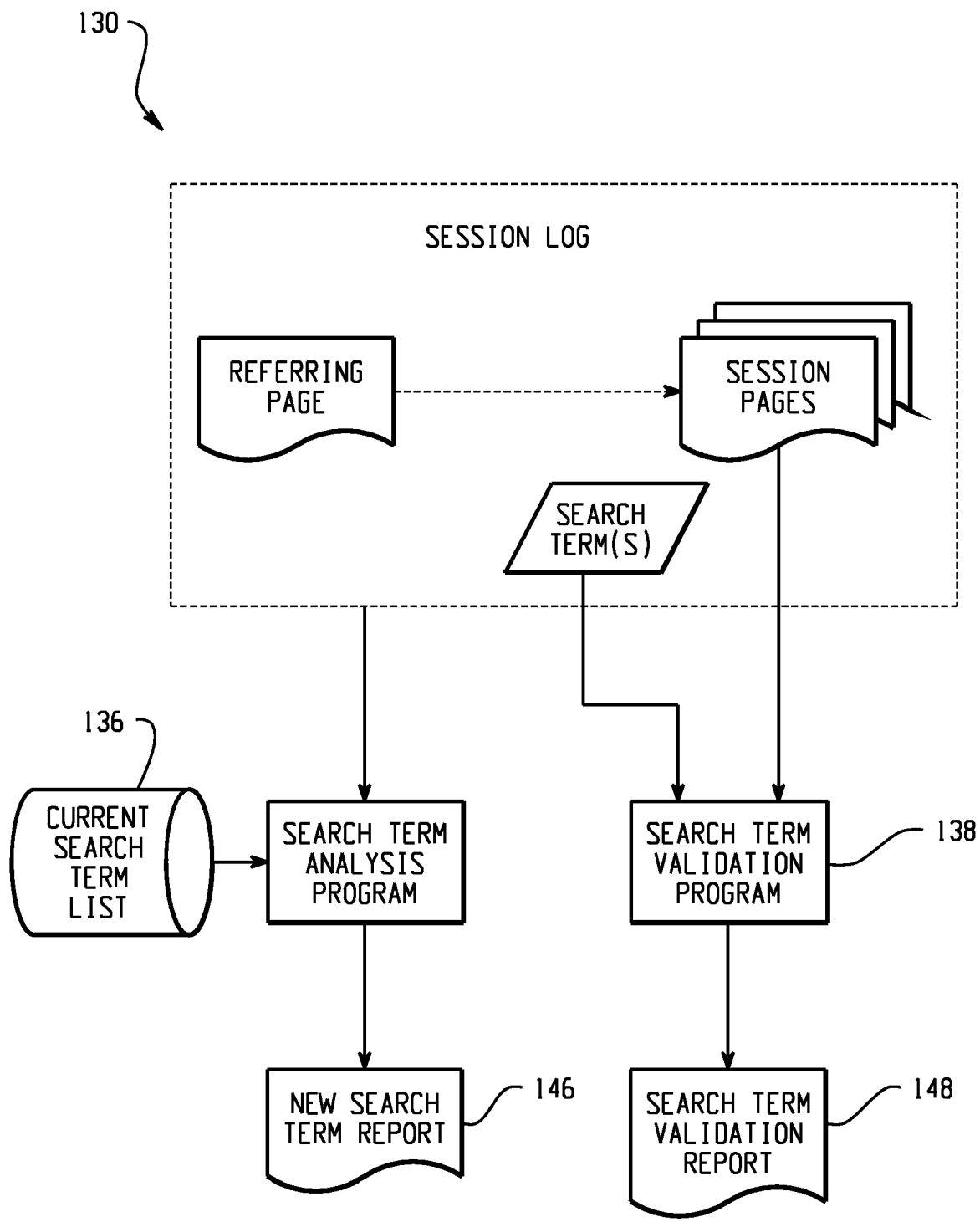
FIG. 7 is a block diagram depicting an example computer-implemented system for identifying web site search terms from user internet-related activity data and for verifying the effectiveness of search terms.

FIG. 7 is a block diagram depicting an example computer-implemented system 130 for identifying web site search terms from user internet-related activity data and for verifying the effectiveness of search terms. System 130 includes a search term validation program 138 that generates a search term validation report 148. The search term validation program 138 is operable to verify the usefulness of search terms by showing the paths taken by sessions driven to the web site by particular search terms and by calculating statistics for the search terms based on the paths. The search term validation program 138 may verify the usefulness of one or more of the currently-owned search terms 136, and may also verify the usefulness of candidate search terms 146 prior to purchase.

The statistics calculated by the search term validation program 138 may include, for example, the number of sessions associated with a search term, the percent of all sessions associated with a search term, the average number of pages viewed during a session initiated with the search term, the average time spent on the web site during a session initiated with the search term, the confidence that a user will follow a certain path upon accessing the web site using the search term, the number of sales resulting from sessions initiated with the search term, the number of information requests made during sessions initiated with the search term, or other relevant statistics. This type of information may be used to help determine whether specific search terms should be purchased or continue to be purchased. One example program that may be used to implement the search term validation program 138 is SAS® Enterprise Miner™, sold by SAS Institute Inc. of Cary, N.C.

Figure 8:
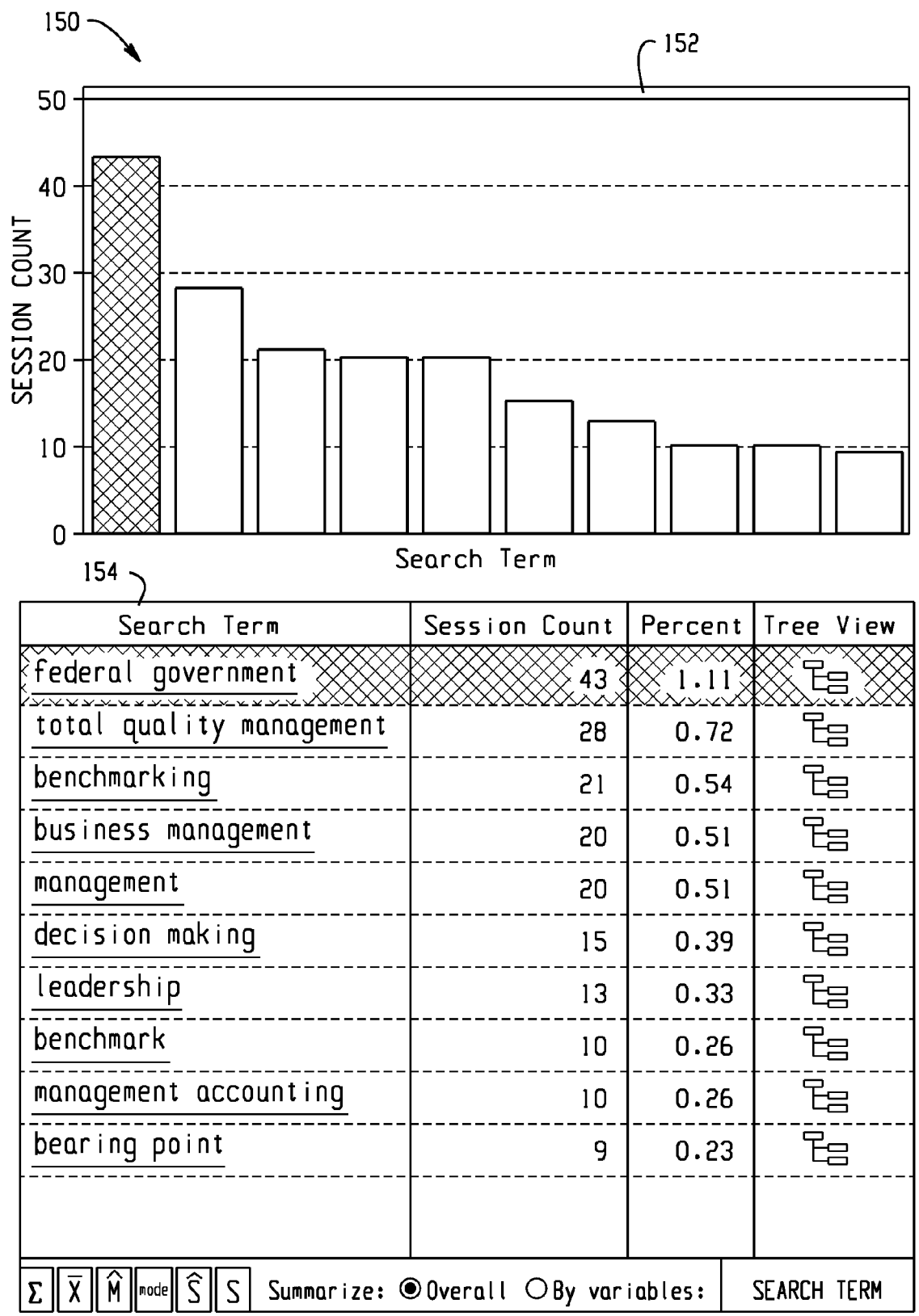
FIG. 8 depicts an example search term validation report that illustrates the effectiveness of search terms.

FIG. 8 depicts an example search term validation report 150 that illustrates the effectiveness of search terms. The report 150 includes a bar graph 152 and a chart 154. The chart 154 lists a session count and percent value for each of a plurality of search terms. The session count identifies the number of sessions that have been initiated using the search term. The percent value shown in the chart 154 indicates the percentage of sessions that are initiated using the search term. The session count for each of the listed search terms is also shown in graphical form in the bar graph 152. For example, when one of the search terms is selected in the chart 154, the corresponding bar on the bar graph 152 may be highlighted. Also shown in the chart 154 is a link to a tree view, an example of which is illustrated in FIG. 10.

FIG. 9 depicts an example of a more detailed search term validation report 160 for a particular search term. This report 160 may, for example, be displayed when a user selects (e.g., by double-clicking) a particular search term in the chart 154 of FIG. 8. The report 160 shown in FIG. 9 identifies the number of times (session count) that a particular path was followed when a session is initiated using the search term. Also presented in the report 160 is the confidence that a particular path will be taken when the search term is used. For instance, the first row of the example report 160 indicates that the "Advanced Search Results" page was reached using the search term "federal government" in 43 sessions (1.11% of all session), and that the validation program predicts that the "Advanced Search Results" page will be reached 100% of the time when this search term is used. The second row of the example report indicates that 31 sessions (0.80%) followed the path "Advanced Search Results" and then "Site Exit", and predicts that this path will be followed 72.09% of the time. With this information, a user can determine the probability that the search term will lead to a certain web page, result in a sale, etc.

Figure 10:
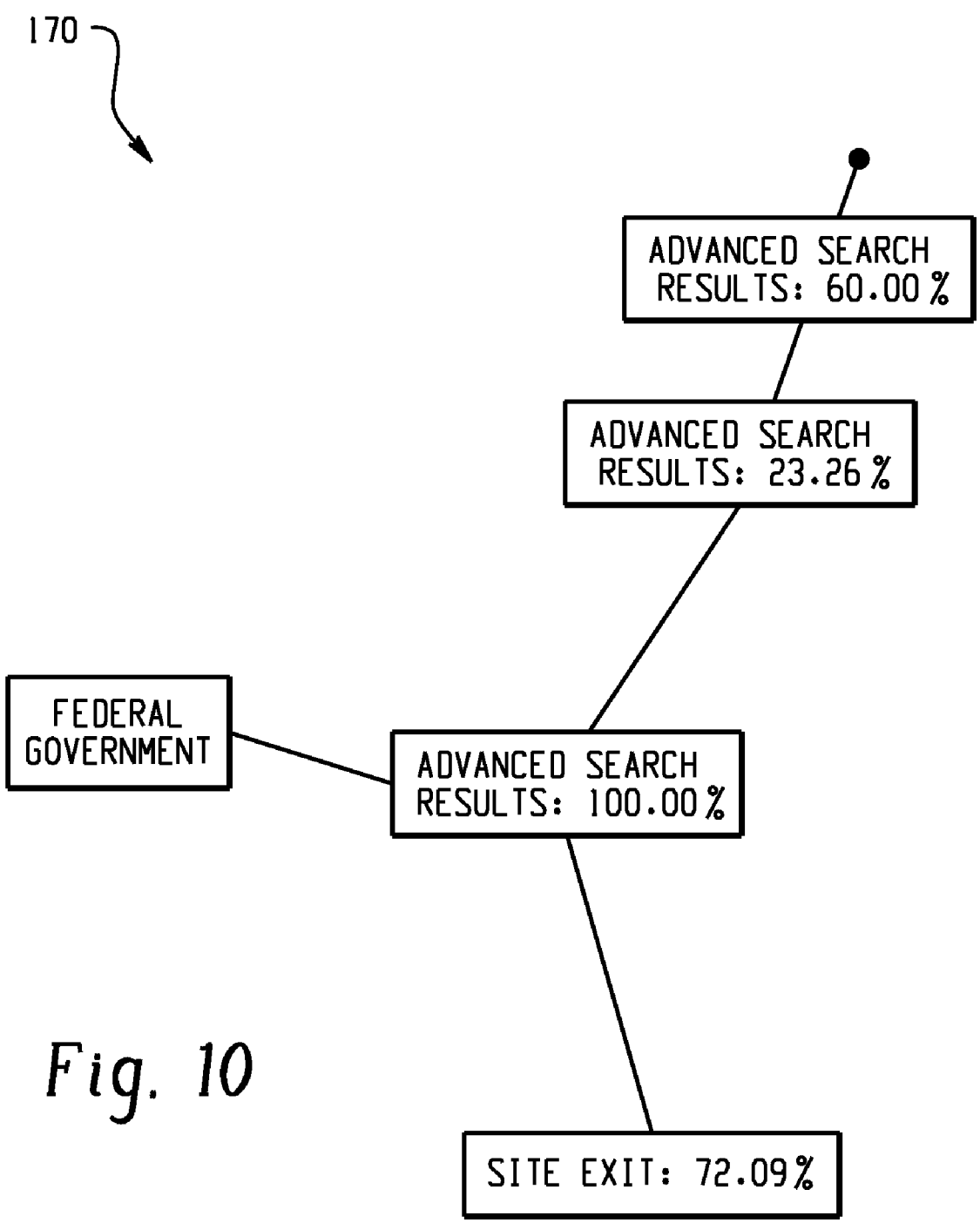
FIG. 10 depicts an example of a tree view of a validation report.

FIG. 10 depicts an example of a tree view 170 of a validation report. In this example, the statistical information for a particular search term is displayed in the form of a tree chart. This chart 170 may, for example, be displayed when a user selects the tree view icon in the chart 154 of FIG. 8. The tree chart 170 illustrates the probability (e.g., confidence value) that a particular path will be followed when the web site is accessed using a search term. For instance, in the illustrated example, the chart 170 indicates a 72.09% probability that the path "Advanced Search Results" followed by "Site Exit" will result when the web site is accessed using the search term "federal government."

Figure 11:
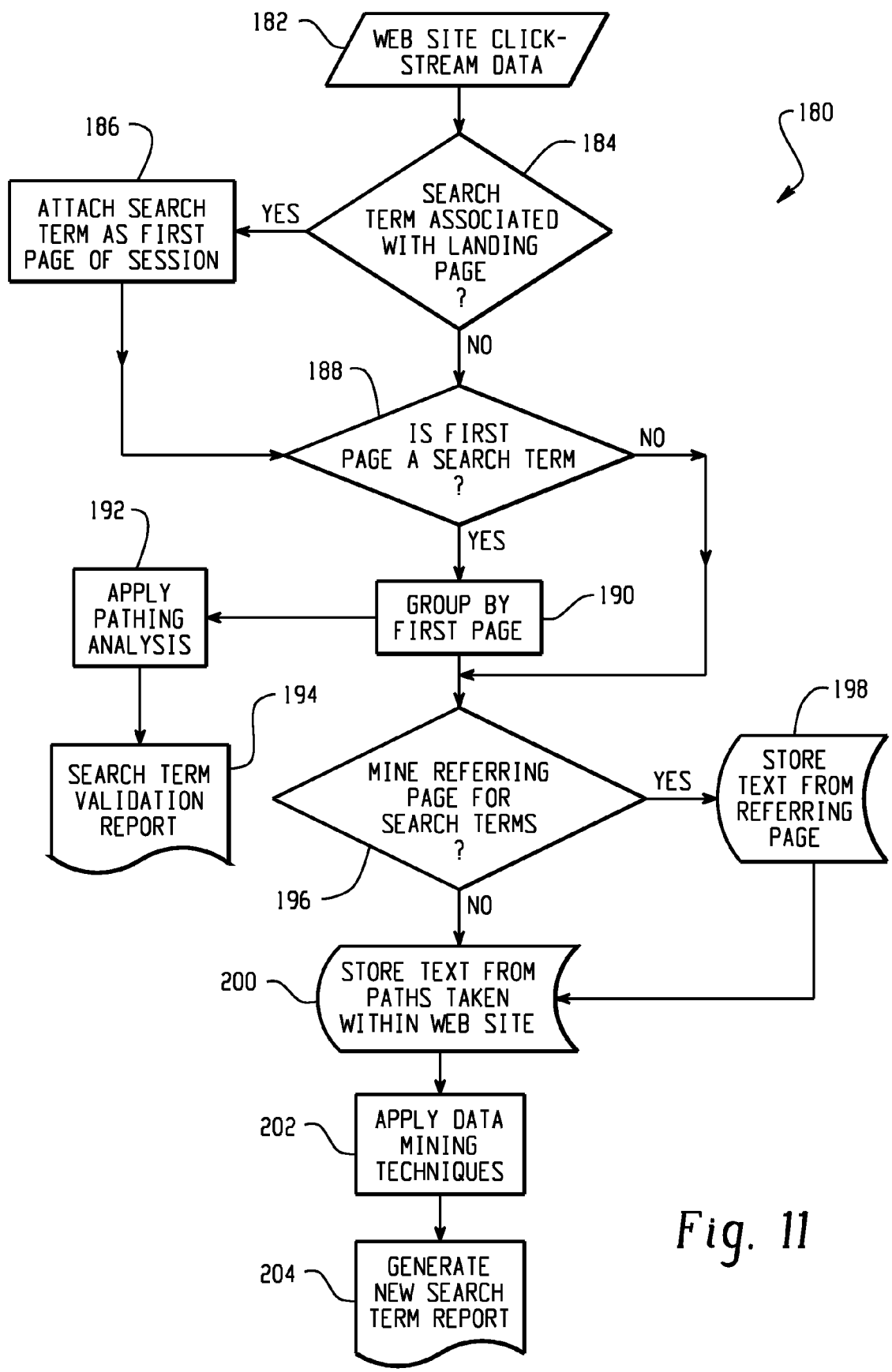
FIG. 11 is a flow diagram depicting an example method for identifying web site search terms from user internet-related activity data and for verifying the effectiveness of search terms.

FIG. 11 is a flow diagram 180 depicting an example method for identifying web site search terms from user internet-related activity data and for verifying the effectiveness search terms. The web site is accessed by a web browser at step 182, providing click-stream data. Click-stream data is information regarding the prior web site (i.e., referring page) or web sites that were accessed by the web browser. An example of web site click-stream data that may be available from the browser is the Uniform Resource Locator (URL) of the referring page and any search terms used to access the web site (e.g., http://www.google.com/search . . . federal+government . . . ). At step 184, the click-stream data is used to determine if a search term was used to locate and access the web site. If a referring search term is included in the click-steam data, then the search term is included in the session log at step 186, for example as the first page of the session log, and the method proceeds to step 188. Else, if no referring search term is included in the click-steam data, then the method proceeds from step 184 to step 188.

At step 188, the method determines if the session log includes a search term. If a search term is included, then the method proceeds to step 190. If no search term is included in the session log, then the method bypasses step 190 and proceeds to step 196.

At step 190, the session logs are grouped by the search terms, for example by sorting the session logs according to their first page when the search term has been attached as the first page of the session log. The grouped session logs are then processed at step 192 to verify the effectiveness of the search terms and generate a search term validation report (step 194). The search term validation report may show the paths taken in each session and relevant statistics for the search terms based on the paths. The statistics calculated at step 192 may include, for example, the number of sessions associated with a search term, the percent of all sessions associated with a search term, the average number of pages viewed during a session initiated with the search term, the average time spent on the web site during a session initiated with the search term, the confidence that a user will follow a certain path upon accessing the web site using the search term, the number of sales resulting from sessions initiated with the search term, the number of information requests made during sessions initiated with the search term, or other relevant statistics.

At step 196, the method determines whether the referring page is to be processed to identify candidate search terms. The decision at step 196 may be based on user input. For example, a user may be able to pre-select whether all or no referring pages are processed, or the user may be able to input instructions for each session on a case-by-case basis. In another example, a user may be able to input criteria used by the method to determine which session pages should be processed and which should not. As an illustration, a user may be able to select one or more specific web sites that are to be mined for search terms if they are the referring page of the session, or the user may be able to input some other criteria for the method to determine which referring pages to process (e.g., only mine search engines sites, never mine search engine sites, etc.)

If the method determines that the referring page is to be processed for candidate search terms, then data (e.g., textual data) from the referring page is stored in the session log at step 198 and the method proceeds to step 200. Otherwise, if the referring page is not to be processed for candidate search terms, then the method proceeds from step 196 to step 200.

At step 200, data from the session pages is stored in the session log. The stored data may include textual data from the session pages, search terms used during the session, textual data from attachments to the session pages (e.g., articles, data sheets, etc.), or other data that may be of interest in identifying candidate search terms. Data mining techniques are then applied to the data stored in the session log at step 202 to identify one or more candidate search terms. The data mining techniques may, for example, include word correlation techniques (e.g., based on the number of times a word appears within a predetermined proximity of a search term), or may include other data mining techniques, such as building a data warehouse of terms from the stored data and applying various models to uncover statistical relationships between the terms and existing search terms. The candidate search terms identified in step 202 are then displayed in a new search term report at step 204.

This written description uses examples to disclose the invention, including the best mode, and also to enable a person skilled in the art to make and use the invention. The patentable scope of the invention may include other examples that occur to those skilled in the art. For example, the search term analysis program may also be able to analyze graphical data to identify search terms for use in next-generation search engine programs that are able to process graphical data.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method for identifying web site search terms, comprising:
    receiving, using one or more processors, a session log;
    transmitting a first request from a web browser to a web server requesting access to one or more web pages of a web site, the first request including one or more referring search terms;
    using the one or more referring search terms to identify one or more web pages;
    storing content of the one or more web pages and content of a referring web page corresponding to the web browser in the session log, wherein the referring web page includes information used to ascertain the location of a user prior to the first request;
    receiving a current search term list including one or more purchased current search terms used to locate information associated with the web site;
    processing the session log to identify one or more candidate search terms in the one or more web pages and the referring web page stored in the session log;
    comparing the one or more candidate search terms with the one or more purchased current search terms, wherein the comparison identifies one or more additional search terms to add to the current search term list, and
    storing the one or more additional search terms.

2. The computer-implemented method of claim 1, wherein the session log also stores the one or more referring search terms used to locate the web site from the referring web page, and wherein the session log is processed to identify the one or more candidate search terms by relating textual data stored in the session log with the one or more referring search terms.

3. The computer-implemented method of claim 2, wherein the one or more referring search terms are stored as a first page of the session log.

4. The computer-implemented method of claim 2, further comprising:
processing click-stream data to identify the one or more referring search terms.

5. The computer-implemented method of claim 1, wherein the session log is processed to identify the one or more candidate search terms by relating textual data in the session log with the one or more purchased current search terms.

6. The computer-implemented method of claim 1, further comprising:
generating display information that includes the one or more candidate search terms; wherein the generated display information is for use in providing a graphical display that shows the one or more candidate search terms.

7. The computer-implemented method of claim 1, wherein the one or more candidate search terms are identified based upon the frequency that the one or more candidate search terms are included in the session log.

8. The computer-implemented method of claim 1, wherein the session log also stores the one or more referring search terms used to locate the web site from the referring web page, and wherein the session log is processed to identify one or more candidate search terms based upon a statistical correlation between the one or more candidate search terms and the one or more referring search terms.

9. The computer-implemented method of claim 1, wherein the session log is processed to identify one or more candidate search terms based upon a statistical correlation between the one or more candidate search terms and the one or more purchased current search terms.

10. The computer-implemented method of claim 1, further comprising:
storing the one or more referring search terms in the session log, wherein the one or more referring search terms are used to locate the web site from the referring web page;
grouping a plurality of session logs according to the one or more referring search terms;
processing the plurality of session logs to calculate probability information relating to the one or more referring search terms and the one or more web pages within each session log; and
generating display information that includes the one or more referring search terms and the probability information, wherein the generated display information is for use in providing a graphical display that relates the probability information to the one or more referring search terms.

11. The computer-implemented method of claim 10, wherein the plurality of session logs are processed to identify a probability that a particular path of web pages will be accessed during a web browser session initiated by the one or more referring search terms.

12. The computer-implemented method of claim 10, wherein the plurality of session logs are processed to identify a number of sessions that include the one or more referring search terms.

13. The computer-implemented method of claim 10, further comprising:
processing the plurality of session logs to calculate one or more of a number of sessions associated with the one or more referring search terms, a percent of all sessions associated with the one or more referring search terms, an average number of web pages viewed during each session initiated with the one or more referring search terms, a number of sales resulting from sessions initiated with the one or more referring search terms, or a number of information requests made during each session initiated with the one or more referring search terms.

14. The computer-implemented method of claim 1, further comprising:
identifying the one or more candidate search terms using a data mining application that includes word correlation, clustering techniques, or prediction algorithms.

15. The method of claim 14, wherein the data mining application builds a data warehouse of terms associated with the one or more web pages and applies one or more models to generate statistical relationships between the one or more referring search terms and the terms associated with the web pages.

16. The method of claim 14, wherein the data mining application uses criteria to identify the one or more candidate search terms, and wherein the criteria includes the frequency that the term appears in the referring page or the one or more web pages, the proximity of the term to other terms in the referring web page or the one or more web pages, or the web page on which the term appears.

17. A system, comprising:
a processor;
a computer-readable storage medium containing software instructions executable on the processor to cause the processor to perform operations including:
receiving, using one or more processors, a session log;
transmitting a first request from a web browser to a web server requesting access to one or more web pages of a web site, the first request including one or more referring search terms;
using the one or more referring search terms to identify one or more web pages;
storing content of the one or more web pages and content of a referring web page corresponding to the web browser in the session log, wherein the referring web page includes information used to ascertain the location of a user prior to the first request;
receiving a current search term list including one or more purchased current search terms used to locate information associated with the web site;
processing the session log to identify one or more candidate search terms in the one or more web pages and the referring web page stored in the session log;
comparing the one or more candidate search terms with the one or more purchased current search terms, wherein the comparison identifies one or more additional search terms to add to the current search term list, and
storing the one or more additional search terms.

18. The system of claim 17, wherein the session log stores the one or more referring search terms used to locate the web site from the referring web page.

19. The system of claim 18, wherein the one or more referring search terms are stored as a first page of the session log.

20. The system of claim 18, wherein the session log is processed to identify the one or more candidate search terms by relating textual data stored in the session log with the one or more referring search terms.

21. The system of claim 17, wherein the session log is processed to identify the one or more candidate search terms by relating textual data in the session log with one or more purchased current search terms.

22. The system of claim 17, wherein the one or more candidate search terms are provided as a list, and wherein the list of the one or more candidate search terms facilitates the purchase of a candidate search term.

23. The system of claim 17, wherein display information that includes the one or more candidate search terms is generated, and wherein the generated display information is for use in providing a graphical display that shows the one or more candidate search terms.

24. The system of claim 17, wherein the one or more candidate search terms are identified based upon the frequency that the one or more candidate search terms are included in the session log.

25. The system of claim 17, wherein the session log stores the one or more referring search terms used to locate the web site from the referring web page, and wherein the session log is processed to identify one or more candidate search terms based upon a statistical correlation between the one or more candidate search terms and the one or more referring search terms.

26. The system of claim 17, wherein the one or more candidate search terms are identified based upon a statistical correlation between the one or more candidate search terms and the one or more purchased current search terms.

27. The system of claim 17, further comprising:
storing the one or more referring search terms used to locate the web site from the referring web page;
using a search term validation program configured to group a plurality of session logs according to the one or more referring search terms; and
processing the plurality of session logs to calculate probability information relating to the one or more referring search terms and the one or more web pages within each session log.

28. The system of claim 27, wherein the search term validation program generates a search term validation report.

29. The system of claim 27, wherein the search term validation program calculates statistics for a purchased current search term based upon the paths taken by the purchased current search term to the web site.

30. The system of claim 27, wherein the search term validation program calculates statistics for a candidate search term based upon the paths taken by the candidate search term to the web site.

31. A computer-readable storage medium encoded with instructions that when executed, cause a computer to perform a data structure conversion method, comprising:
receiving a session log;
transmitting a first request from a web browser to a web server requesting access to one or more web pages of a web site, the first request including one or more referring search terms;
using the one or more referring search terms to identify one or more web pages;
storing content of the one or more web pages and content of a referring web page corresponding to the web browser in the session log, wherein the referring web page includes information used to ascertain the location of a user prior to the first request;
receiving a current search term list including one or more purchased current search terms used to locate information associated with the web site;
processing the session log to identify one or more candidate search terms in the one or more web pages and the referring web page stored in the session log;
comparing the one or more candidate search terms with the one or more purchased current search terms, wherein the comparison identifies one or more additional search terms to add to the current search term list, and
storing the one or more additional search terms.

32. The method of claim 31, wherein the one or more candidate search terms are identified based upon the frequency that the candidate search terms appear in the one or more web pages or the referring web page.

33. The method of claim 31, wherein the one or more candidate search terms are identified based upon the proximity to the one or more purchased current search terms in the one or more web pages or in the referring web page.

* * * * *